Sept. 18, 1962 D. CRAIG ET AL 3,054,659
METHOD OF PRODUCING VANILLIN AND OTHER USEFUL
PRODUCTS FROM LIGNOSULFONIC ACID COMPOUNDS
Filed Aug. 22, 1958 3 Sheets-Sheet 1

FIG. I

INVENTORS
D. CRAIG &
C. D. LOGAN
BY
PATENT AGENT

Sept. 18, 1962 D. CRAIG ET AL 3,054,659
METHOD OF PRODUCING VANILLIN AND OTHER USEFUL
PRODUCTS FROM LIGNOSULFONIC ACID COMPOUNDS
Filed Aug. 22, 1958 3 Sheets-Sheet 3

EXPERIMENTAL BATCH YIELD CURVE

INVENTORS
D. CRAIG &
C. D. LOGAN
BY
PATENT AGENT

United States Patent Office 3,054,659
Patented Sept. 18, 1962

1

3,054,659
METHOD OF PRODUCING VANILLIN AND OTHER USEFUL PRODUCTS FROM LIGNOSULFONIC ACID COMPOUNDS
David Craig and Charles D. Logan, St. Catharines, Ontario, Canada, assignors to The Ontario Paper Company Limited, Township of Thorold, Ontario, Canada
Filed Aug. 22, 1958, Ser. No. 756,555
3 Claims. (Cl. 23—196)

This invention relates to the production of useful materials including vanillin, acetovanillone, ligin substance, and calcium oxalate from lignosulfonic acid materials.

The production of oxidation products from lignosulfonic acid compounds using lime as the active alkali has been described and claimed in U.S. Patents 2,576,752 and 2,576,753, issued November 27, 1951, to Fisher and Marshall, and No. 2,576,754, issued on the same date to Fisher and Sankey. In our co-pending application Serial Number 756,612 of even date hereof methods have been described and claimed by which useful materials can be obtained from the sludge or solid phase resulting from the processes according to the above mentioned patents. In general the process according to our said co-pending application comprises leaching the said solids with sodium carbonate solution thereby dissolving its constituents other than calcium carbonate, separating the calcium carbonate and converting it to lime, and treating the liquors residual after removal of the said carbonate by a series of steps to separate and recover lignin substance, vanillin, acetovanillone, calcium oxalate and sodium values residual from the said process. There is also disclosed and claimed in our said co-pending application the preferred embodiment of subjecting the sludge constituting the solid phase in an aqueous suspension in the presence of sodium carbonate and lime to an oxidative step under superatmospheric pressure by passing through the above mixture a gas containing free oxygen in finely dispersed form under temperature conditions in the range of 120° C. to 200° C. and under stated conditions of alkalinity, partial oxygen pressure and time. The advantages of including such an oxidative step are fully set out in our said co-pending application. Finally, in the said co-pending application it is disclosed and claimed that an aqueous medium may be used containing dissolved lignosulfonic acid compounds. Thus, instead of treating the said solid phase with an aqueous solution of sodium carbonate, it may be treated with an aqueous solution of sodium carbonate in sulphite waste liquor or in the said liquor which has previously been treated to reduce the fermentable sugar content thereof.

In the practice of the invention according to our said co-pending application the controlled alkaline oxidation of lignosulfonic acid compounds using lime as the active alkali in accordance with U.S. Patents 2,576,752, 2,576,753 and 2,576,754 and the treatment of the solid phase in accordance with our said co-pending application constitute two separate and distinct processes requiring separate reactors for the reaction step and chemical plant for each of the two said processes.

We have now discovered that it is possible to combine the two processes into a single process in a manner which greatly reduces the amount of chemical plant required while still fully retaining the maximum advantages of both of the said processes. The useful materials obtained in accordance with our new invention comprise the vanillin values obtainable in accordance with the processes described in U.S. Patents 2,576,752, 2,576,753 and 2,576,754 together with those which are produced in accordance with our said co-pending application.

We have conceived the idea that the solid phase or

2 sludge, formed in accordance with the processes of U.S. Patents 2,576,752, 2,576,753 and 2,576,754, can be treated with sodium carbonate in situ in the reaction zone as it is formed and that if, in the said reaction zone, there be established the requisite conditions of sodium carbonate to lime balance, alkalinity, temperature and partial oxygen pressure according to the process of our said co-pending application the result will effectively consolidate into a single step the requirements of both processes and reap the benefits of both.

In the accompanying drawings FIGURE 1 shows in diagrammatic form an apparatus used in practising our invention.

Figure 1:
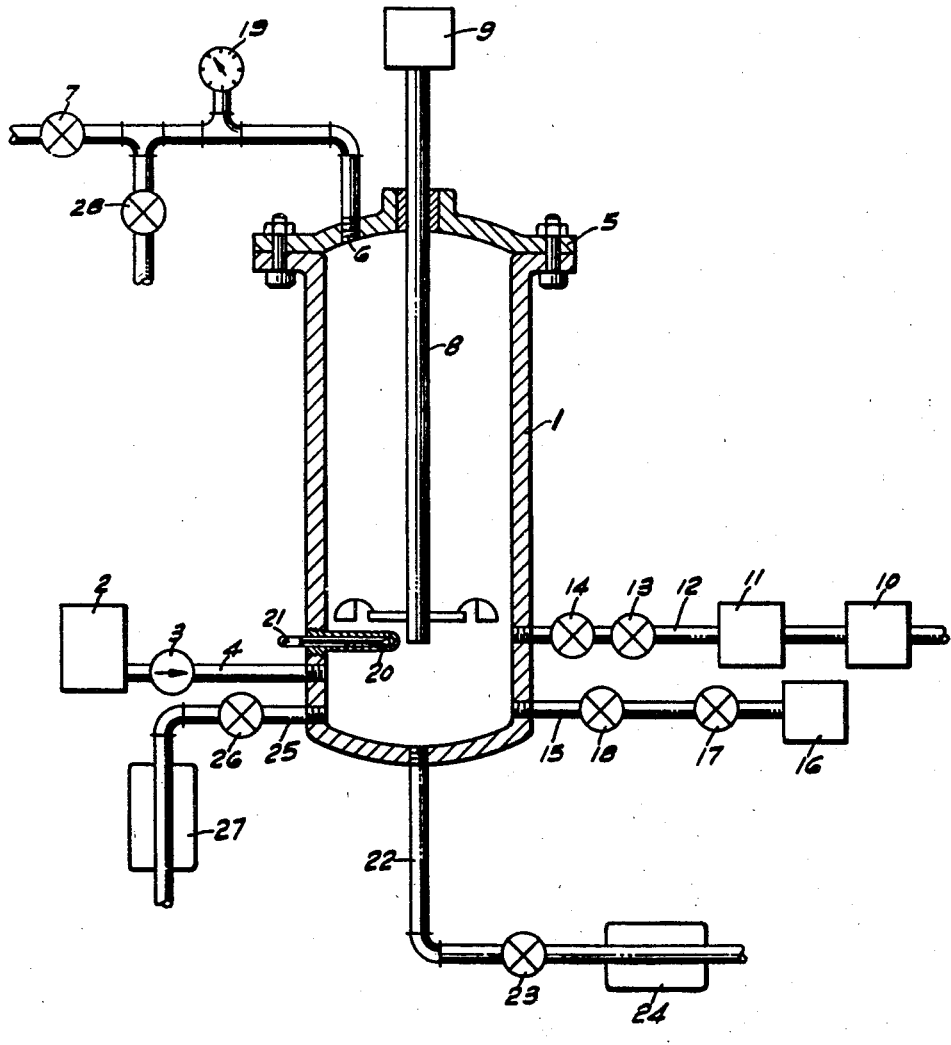

In the practice of our invention we employ apparatus as illustrated in FIGURE 1 which shows in diagrammatic form an apparatus which we have used in some of our experiments comprising a reaction vessel 1 into which the reactants are introduced from the tank 2 by means of the pump 3 and pipeline 4, a cover 5 containing an opening 6 leading to a control back pressure relief valve 7 which limits the maximum pressure in the reaction system to a predetermined value and maintains the pressure thereat. The materials in the reaction zone are agitated by the agitator 8 which in FIGURE 1 is shown as a turbo-mixer type. This turbo-mixer is driven by the motor 9. Compressed air is introduced from the compressor 10 through the tank 11 and the pipeline 12 into the reactor in which it is diffused by the action of the turbo-mixer 8, the pressure and the rate of flow of air being regulated by the valves 13, 14.

Figure 2:
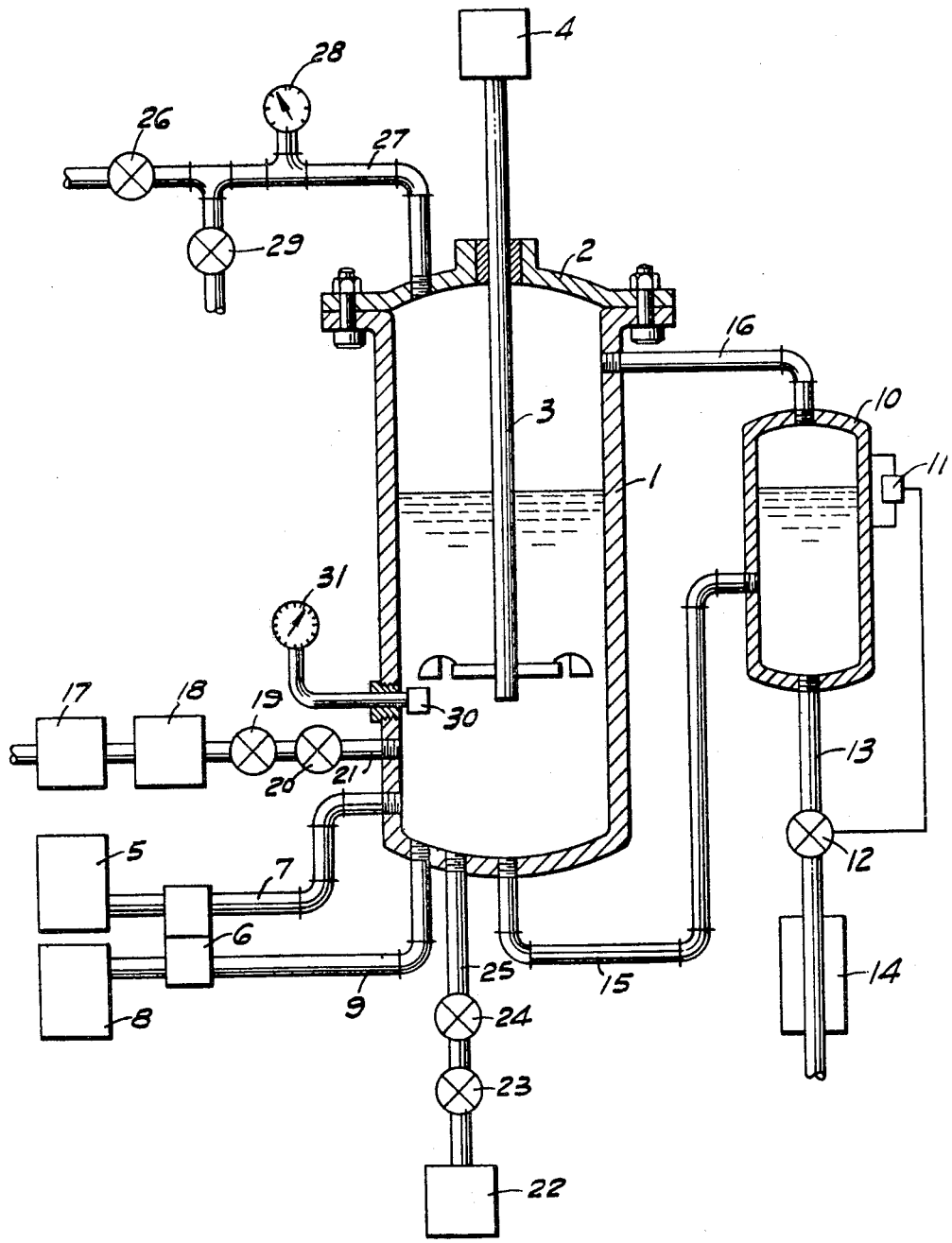
FIGURE 2 shows in diagrammatic form a similar apparatus used in practising our invention by continuous processing.

The reaction vessel is heated by direct steaming through the pipeline 15, steam being supplied from the boiler 16 and regulated as to pressure and flow by the valves 17, 18. Other suitable heating means may, of course, be substituted. The reaction vessel is also equipped with a pressure gauge 19 and a thermometer well 20 containing a thermometer 21. The reaction vessel may be emptied through the opening 22 controlled by the valve 23 which provides for general liquor discharge. This discharge is made through the cooler 24. There is also provided a sampling line 25 controlled by the valve 26 and discharging through the cooler 27 by means of which small samples may be withdrawn at any time. A general relief valve 28 is also provided for general pressure reduction when required. In the alternative we may employ a continuous processing technique for which purpose we use and employ apparatus as illustrated in FIGURE 2 in which we employ a reaction vessel 1 equipped with a cover 2 and with provision for agitation, the type indicated being the turbo-mixer 3 driven by the motor 4. The lignosulfonic acid compound, for example, alcohol plant effluent, is introduced from its storage tank 5 through the proportionating pump 6 via pipeline 7 into the reactor. The slaked lime slurry, with sodium carbonate in solution, is introduced from its storage tank 8 through the proportionating pump 6 which regulates the relative volumes of the reactants and through the pipeline 9 into the reactor 1. The level in the reactor is controlled through the auxiliary level control tank 10 and the level control mechanism 11 which operates the discharge valve 12, the reactor discharge going out through the pipeline 13 controlled by the valve 12 and through the cooler 14. The pipelines 15 and 16 provide respectively the liquor phase and gaseous phase connections between the reaction vessel 1 and the level control tank 10. Air is introduced from the compressor 17 through the tank 18 and valves 19, 20 which control the pressure and rate of air flow, the air being introduced into the reactor through the pipe 21 and dispersed therein by the turbo mixer 3.

Heat is provided by steam produced in the boiler 22 regulated as to pressure and volume by the valves 23, 24, and introduced into the reaction vessel 1 through the pipeline 25. Any other suitable heating means may, of course, also be used.

Pressure is regulated by means of the control back pressure valve 26 which limits the maximum pressure in the reaction system to a predetermined value and maintains the pressure thereat. This back pressure valve is connected to the reactor through the pipeline 27 to which are also connected a pressure gauge 28 and a general pressure relief valve 29 which may be used when required. Provision is made for temperature measurement in the reactor by the thermocouple 30 and its temperature recorder 31.

We then proceed to derive one or more useful products such as vanillin, acetovanillone, lignin substance, calcium oxalate and sodium values by means of a process forming the subject matter of our invention. Thus, calcium carbonate can be separated by filtration of the reaction products, taken to a lime kiln and converted to quick lime which may be cycled back for use in the process according to our invention or employed for other uses. Vanillin may be extracted from the filtrate in the form of its sodium derivative according to such processes as those described in U.S. Patent 2,104,701, Sandborn; U.S. Patent 2,399,607, Servis; U.S. Patent 2,489,200, Sankey and Marshall; U.S. Patent 2,721,221, Bryan. Vanillin may also be recovered in the alternative by acidifying the filtrate, for example, by sulphuric acid sufficient to release free vanillin in solution from the form of its sodium derivative, after which the vanillin may be extracted by such solvents as benzene, toluene, etc., as is well known. Acidification of the filtrate as above also results in the precipitation of lignin substance and if such lignin substance precipitates at the pH desired for vanillin extraction we prefer, prior to extraction of vanillin, to acidify to a pH between 5 and 4 and remove the lignin substance by filtration prior to extracting vanillin. The said lignin substance may be converted to a soluble form, for example, that of a sodium salt which may be employed as a dispersant. The filtrate, following removal of lignin substance, may be treated with controlled amounts of lime to precipitate calcium oxalate, which can in turn be removed by filtration. The calcium oxalate may then be converted to oxalic acid. Substantial sodium values are present in the filtrate residual from the separation of calcium oxalate and they may be recovered, for example, by evaporation and crystallization in the form of sodium sulphate. Alternately, the residual liquor may be evaporated and pyrolized to recover sodium values in the form of sodium carbonate. As an example of a technique which may be applied for this purpose reference is made to "Chemical Recovery From Neutral Sulphite Semi-Chemical Spent Liquors by the Atomized Suspension Technique," Lee and Gauvin, TAPPI, volume 41, pp. 110–116, March 1958, and to Canadian Patent 552,789, Gauvin, Feb. 4, 1958. In the alternative other known methods of converting sodium sulphate to sodium carbonate may be employed. Such methods have, for example, been described by Haywood, "Possible Processes for Recovering Soda and Sulphur From Semichemical and Acid Sulphite Waste Liquors," TAPPI, vol. 37, No. 2, pp. 134A–136A and in U.S. Patent 2,788,273, Shick, issued April 9, 1957.

If sodium values are recovered in the form of sodium carbonate the latter may be recycled for use in additional processing according to the process of our invention or for other uses.

We are aware that sodium carbonate and lime react to produce caustic soda in solution. Indeed Kurschner ("Technologie und Chemie der Papier-u. Zellstoff Fabrikation" 30, 1–3, (1933)), proposed the use of sodium carbonate and lime in stoichiometric proportions as a substitute for caustic soda as an alkali during the formation of vanillin from sulphite waste liquor. We are also aware that the use of caustic soda as an active alkali during the formation of vanillin from lignosulfonic acid compounds in the presence of air as an oxidizing agent (thus differing from Kurschner) has been disclosed by Salvesen et al. in U.S. Patent 2,434,626, issued January 13, 1948, and by Marshall et al. in U.S. Patent 2,544,999, issued March 13, 1951.

Our invention differs from the known methods of carrying out the controlled alkaline oxidation of lignosulfonic acid compounds in the presence of caustic soda as the active alkali in that the lignin is present in the reactor in part as an insoluble calcium derivative which is gradually solubilized as the oxidation progresses until at the recommended time of removal of the reactants from the reaction zone all the calcium is present as calcium carbonate. Chemically our invention lies between processes such as those described by Salvesen et al. in U.S. Patent 2,434,626 and by Marshall et al. in U.S. Patent 2,544,999 and those where lime is present as the active alkali, i.e., U.S. Patents 2,576,752, 2,576,753 and 2,576,754. That this is the case is established from a consideration of the chemical reactions involved and it is also experimentally demonstrable in that the behaviour of the reaction according to the process of our invention when carried out in a continuous manner is intermediate between that of the soda base and the lime base processes.

In the process according to our invention the sodium carbonate and the lime each have independent functions separate and distinct from their common function of reacting in stoichiometric proportions to produce caustic soda in solution. The considerations involved may be illustrated by an example when waste sulphite liquor residual from a sulphite pulping process in which a calcium base has been employed is used as a raw material. The sodium carbonate reacts with the calcium values present in the liquor to form a precipitate of calcium carbonate and at the same time to form the corresponding sodium salts of the lignosulfonic acid compounds present. In the co-presence of lime this reaction does not go to completion rapidly but continues throughout the oxidative step, i.e., both sodium salts of lignin in solution and calcium salts of lignin as part of the solid phase are present, the latter progressively decreasing throughout the oxidative step and, according to the preferred practice of our invention, being completely consumed by the end of the oxidative step. Secondly, and independently of the above, sufficient sodium carbonate is required to react with lime to produce caustic soda and precipitate equivalent calcium carbonate. The caustic soda so formed in situ is the principal active alkali present during the subsequent oxidative step. Lime is, however, also required for purposes independent of the above. It serves to precipitate at the start of the reaction a substantial portion of lignosulfonate material in the form of the corresponding calcium derivatives which, as noted above, are gradually solubilized as the oxidation proceeds and there is needed in addition an amount of lime sufficient to react with carbon dioxide formed during the oxidative step (producing additional calcium carbonate) and thus effectively reducing the alkali requirements which would otherwise have to be supplied by more expensive caustic soda formed in situ by stoichiometric reaction of sodium carbonate and lime. The optimum amount of lime to be employed in accordance with our invention is such as to provide lime for the above purposes but not in excess thereof because it is undesirable that calcium compounds other than calcium carbonate be present in the solid phase residual from the oxidative step. In the practice of our invention it is therefore preferred that the amount of lime added prior to such oxidative step be limited so that no such calcium compounds are so present. In this connection we have observed, as noted in our co-pending application of even date hereof, that the presence of calcium compounds other than calcium carbonate in the reactants following the reactive step is readily apparent because when such compounds are present the solid phase discharged from the reaction zone is typically of a light tan colour rather than white or gray. Difficult filtering characteristics of such solid phase are also an almost certain sign of the presence of such compounds. If in fact too large a quantity of lime has been added resulting in the undesirable condition above noted this may be corrected by treating the materials discharged from the reaction zone with carbon dioxide gas at a pH of 12 or greater, or, alternatively, by adding additional sodium carbonate to the said materials after their discharge from the reaction zone.

In carrying out the oxidative step we have found that this operation should be conducted in the temperature range between 120° C. and 200° C. and we prefer to carry it out at temperatures above 140° C. We also maintain during the oxidative step a pH of 12 or greater, said pH being measured on a sample withdrawn from the reaction zone and cooled to room temperature. It is well known that when lignin substance is subjected to alkaline oxidation under conditions in which vanillin is formed, the formed vanillin is itself subject to oxidation in the reaction zone and to this extent the net vanillin yield is thereby decreased. A time of reaction should therefore be selected having regard to the severity of the oxidation conditions such that excessive decomposition of the formed vanillin does not occur, i.e., that a good net yield of vanillin is obtained. In the practice of our invention we have generally found that the preferred reaction time is less than 2 hours and that a shorter time is preferred corresponding to more severe conditions of oxidation such as higher temperatures, higher partial oxygen pressure, and/or higher air flow. We have also found that the net vanillin yield is more likely to be reduced due to oxidation of formed vanillin under reaction conditions corresponding to higher partial oxygen pressure. In any event the reaction becomes more difficult to control as higher partial oxygen pressures are employed. We therefore prefer to operate at partial oxygen pressure (entering the reaction zone) lower than 20 pounds per square inch and, indeed, when reaction temperatures of the order of 175° C. and higher are employed, we prefer to employ partial oxygen pressures of less than 10 pounds per square inch. Our invention discloses that satisfactory yields of vanillin can be obtained in the general range of conditions as set out herein and the selection of preferred conditions as to severity and time of oxidation within this range may readily be ascertained by anyone who is normally skilled.

During the reaction adequate agitation of the reactants in the reaction zone is highly desirable. This agitation serves to disperse the gas containing oxygen into small bubbles and thus increase the exposure of the materials being oxidized to the oxygen content of the said gas bubbles. Agitation also maintains the solid phase in the reactor in suspension.

Because it requires less alkali, waste sulphite liquor which has been previously treated to reduce the fermentable sugar content thereof is a particularly suitable material for the application of our invention. As an example we prefer to use the liquor remaining after sulphite waste liquor has been subjected to fermentation to produce ethyl alcohol (which residual liquor is hereinafter referred to as "alcohol plant effluent").

We have also found that many of the preferred steps in the application of our co-pending application of even date are applicable to our present invention as well. Thus the discovery which we made and disclosed in our said co-pending application that if an attempt is made to slake lime directly in alcohol plant effluent some of the lime particles become coated with calcium derivatives of lignosulfonic acid materials, the slaking operation is rendered difficult and there is excessive foaming, applies equally in the case of the present invention. This can be avoided if, prior to the slaking operation, sodium carbonate is dissolved in the alcohol plant effluent. The lime is then slaked in such a solution. As noted in our said co-pending application a precipitate of lignin substance may form when sodium carbonate is dissolved in alcohol plant effluent if the carbonate concentration is too high or if, at a given concentration, the temperature is too high. For this reason we recommend a concentration of sodium carbonate of 3.5 lb./gal. or less since we have found, in general, that a ligneous precipitate does not form under conditions of slaking unless the concentration of sodium carbonate in alcohol plant effluent is greater than 3.5 lb./gal. Such a procedure is therefore a preferred embodiment of our invention and is strongly recommended.

In the recovery of lignin substance and of vanillin values we have also found that the precipitation and filtration of lignin substance prior to vanillin extraction is preferred and that in such case the precipitate of lignin substance should be washed with a raffinate obtained following extraction of vanillin by an appropriate solvent, for example, toluene, to recover vanillin values adsorbed or occluded with the lignin while still retaining the lignin in a form which is readily separable. The use of a surface active agent as a de-emulsifier during the extraction of vanillin is also recommended for the same reason as disclosed in our said co-pending application. We also prefer to strip retained solvent from the raffinate residual from vanillin extraction before proceeding with further steps.

With a view to the eventual recovery of sodium values, the advantage of avoiding any unnecessary or undue dilution of the reactants applies in a manner similar to that disclosed in our co-pending application. The sodium values may also be recovered as disclosed in our said co-pending application either by evaporation in the form of sodium sulphate or by evaporation and pyrolysis in the form of sodium carbonate.

If sodium values are recovered in the form of sodium carbonate these may, of course, be recycled in further operation of the process according to our invention. Likewise the solid phase resultant from the oxidative step and comprising calcium carbonate may be heated to produce lime and said lime recycled for use in our said process.

The following experiments are illustrative of the application of our invention.

*Example 1*

There were charged into a reaction vessel such as that illustrated in FIG. 1 thirty gallons of a reaction mixture comprising 28.2 gallons of alcohol plant effluent containing 0.86 pound total solids per imperial gallon together with 22.6 pounds sodium carbonate and 16.4 pounds slaked lime, the lime having been slaked in a solution of sodium carbonate in alcohol plant effluent of the same proportion of sodium carbonate to alcohol plant effluent as above. The reaction vessel was closed and preheated to 163° C. Air was introduced at a rate equivalent to 500 cubic feet per hour. The temperature rose rapidly to 180° C. due to the exothermic character of the reaction and was maintained at that level. The total pressure was maintained at 155 p.s.i. gauge corresponding to a partial oxygen pressure of 5 p.s.i. The reaction was allowed to continue for 55 minutes after which the charge was flash discharged into a receiver under atmospheric pressure. The reactants were filtered to remove the solid phase, comprising chiefly calcium carbonate, the residual liquor was then acidified to pH 5 to precipitate lignin which was in turn removed by filtration, residual liquor was extracted with toluene to recover vanillin and acetovanillone values (Oronite wetting agent "S" being used as a de-emulsifying agent), the lignin substance previously removed being in turn washed with the raffinate following the toluene extraction which was in turn again extracted with toluene to recover additional vanillin and acetovanillone values, the toluene was stripped from the combined raffinates, sufficient lime added to precipitate calcium oxalate which was removed by filtration, the residual liquor adjusted to pH 7.5 with sodium carbonate, and the sodium values recovered by evaporation in the form of sodium sulphate.

The useful products recovered included the following:

|  | Lb. |
|---|---|
| Solid phase [1] | 31.6 |
| Lignin substance | 6.3 |
| Vanillin | 1.2 |
| Acetovanillone | 0.1 |
| Calcium oxalate | 0.6 |
| Sodium sulphate | 30.2 |

[1] Containing by analysis 96.5% $CaCO_3$.

In Example 1 we employed Oronite wetting agent "S" as a suitable surface active agent during the step of vanillin extraction. We have also found that the following surface active agents may be satisfactorily employed: Tetraprene AS, Canadian Aniline & Extract Co., Ltd.; Parnol 85, Jacques Wolf & Co.; Nacconol NR, National Aniline Div., Allied Chemical & Dye Corp.; Monosulph, Nopco Chemical Co.; Kreelon 4G, Wyandotte Chemical Corporation; Kaywet #40, Kraft Chemical Co. Inc.; Solvadine G, Ciba Co. Inc.

It is well known that the efficiency of any given surface active agent to reduce, limit or prevent emulsion formation depends upon the physico-chemical properties of the materials present and such conditions as temperature. The selection of such an agent for a particular given purpose must therefore be determined by experiment. We have ascertained that the surface active agents listed above are suitable for use according to our invention. It will be noted that the agents listed are all in the general class of alkyl-aryl sulfonates which therefore appear generally, but not necessarily invariably, suitable for use. The selection of other suitable agents can be readily determined experimentally by anyone skilled in the art.

When, therefore, in the specification and claims we refer to a de-emulsifying agent or to a surface active agent as a de-emulsifier we refer to and mean a material selected from the class comprising the surface active agents listed above and other surface active materials which perform the same function under the conditions according to the practice of our invention.

*Example 2*

Experiments were conducted with the same alcohol plant effluent in similar manner to Example 1 with the exception that in one case the amount of slaked lime used was reduced to 13.5 lb. which we judged to be insufficient in accordance with the preferred practice of our invention, and the second instance to 19.2 lb. which we judged to be substantially in excess of that recommended and which in fact was such as to give the criteria for excess lime previously indicated. Combining the results obtained in this example with those of Example 1 the following products were derived.

| Product | Example 1 | Insufficient Lime | Excess Lime |
|---|---|---|---|
| Solid phase, lb | 31.6 | 28.8 | 35.0 |
| Calcium carbonate content of solid phase, percent | 96.5 | 97.0 | 82.5 |
| Lignin substance, lb | 6.3 | 6.6 | 4.2 |
| Vanillin, lb | 1.2 | 0.9 | 1.0 |
| Calcium oxalate, lb | 0.6 | 0.7 | nominal |
| Sodium sulphate, lb | 30.2 | 30.8 | 31.6 |

It will be noted that the solid phase is substantially composed of calcium carbonate when the conditions of Example 1 are maintained and also when insufficient lime is present, but that it contains appreciable quantities of materials other than calcium carbonate when excess lime is used. This is also indicated by the quantity of lignin-substance recovered, i.e., it appears that lignin substance (as a calcium derivative) is probably admixed in the solid phase. Similarly when excess lime is used the oxalate formed is admixed with the solid phase as calcium oxalate so that when the raffinate from the subsequent vanillin extraction is treated with lime very little, if any, oxalate is present to form a precipitate.

*Example 3*

An experiment was conducted as in Example 1 in which waste sulphite liquor was employed as the source of lignosulfonic acid compounds. A 30 gallon reaction mixture was used comprising 28.2 gallons waste sulphite liquor containing 0.92 lb. total solids per gallon together with 26.8 lb. sodium carbonate and 19.7 lb. slaked lime, the lime having been slaked in a solution of 3% sodium carbonate in the same waste sulphite liquor. The following products were obtained.

|  | Lb. |
|---|---|
| Solid phase [1] | 37 |
| Lignin substance | 6.5 |
| Vanillin | 1.1 |

[1] Contained 96% calcium carbonate.

The process according to our invention may also be carried out in a continuous manner, that is to say, the reactants may be continuously introduced into and reactants continuously removed from the mixture of materials being agitated in the reaction zone. The results in this instance serve in a highly pertinent manner to differentiate the present process on the one hand from those in which caustic soda is employed as the active alkali, e.g. as described in U.S. Patent 2,434,626, Salvesen, issued January 14, 1948, and U.S. Patent 2,544,999, Marshall and Sankey, issued March 13, 1951, and, on the other hand, from processes in which lime is used as the sole active alkali, e.g., according to U.S. Patents 2,576,752 and 2,576,753, Fisher and Marshall, issued November 27, 1951, and U.S. Patent 2,576,754, Fisher and Sankey, issued on the same date. In the last named patent, it was disclosed that under conditions of continuous operation, a vanillin yield was obtainable even greater than the maximum yield obtainable under corresponding batch operating conditions in spite of the fact that a substantially lower continuous process yield than the maximum batch yield would be anticipated by a consideration of the factors involved in accordance with recognized chemical engineering principles and, in fact, that the vanillin yield obtained by continuous operation was more than half as much again as that which could be properly anticipated from the considerations involved. In the said U.S. Patent 2,576,754, reference was made to a comprehensive treatise on the correlation between batch process and continuous process yields (MacMullen and Weber, Trans. Am. Inst. Chem. Eng. 31, 409–458 (1935)), as well as an instructive example of the application of the principles set out by MacMullen and Weber to the reaction under consideration in the said U.S. Patent 2,576,754. A suggested reason for this remarkable feature of the controlled alkaline oxidation of lignosulfonic acid compounds to produce vanillin in the presence of lime as the active alkali was set out in the said U.S. Patent 2,576,754, col. 5, lines 35 ff. This does not occur when caustic soda is the sole active alkali in accordance with the previously known art, e.g., as disclosed in the patents of Salvesen and of Marshall et al. above mentioned.

Figure 3:
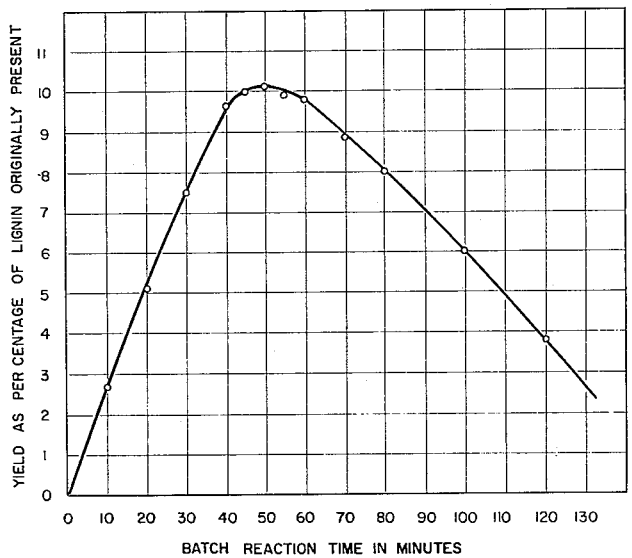
FIGURE 3 is a graph showing the relationship between the yield of vanillin and the time of reaction in batch processing.

As applied to the present invention there is shown in FIGURE 3 the relationship between the yield of vanillin and the time of reaction in batch processing under reaction conditions given as per Example 1, samples being periodically withdrawn from the reaction zone for vanillin determination, and the reaction allowed to continue for 120 minutes. It will be apparent that in a process such as the instant one, which is characterized on a batch basis by an increase in vanillin yield with reaction time up to a peak yield and by a decrease thereafter from this peak yield, the yield for a single batch reactor operating for a time corresponding to the peak yield must necessarily be greater than the expected yield for a continuous process in the same reactor under the same conditions of temperature, pressure, concentration of reactants and agitation, since small increment portions of the reaction mixture in such a continuous process will have been present in the reaction vessel for all times from theoretically zero to theoretically the full time for which the reaction has been in operation from its start-up. Such increment portions will, as discharged from the reactor, correspond to all times over the whole range of the time-yield relationship as applied to the particular reaction in the particular reaction vessel.

Expressed mathetically the distribution of holding times in a continuous process is a time function of the average retention time T and the number of reactors $n$. Let $f(t)$ denote the distribution function referring to the given conditions and $y$ the batch yield at time $t$. The theoretical continuous process yield Y is then given by the integral:

$$Y = \int_0^\infty y f(t) \, dt$$

For a one reactor system $$f = \frac{1}{T} e^{-\frac{t}{T}}$$

which yields $$Y = \int_0^\infty \frac{y}{T} e^{-\frac{t}{T}} dt$$

The values of $y$ at a given time $t$ may be read off the yield-time curve for the batch process whereas the corresponding values of $$\frac{1}{T} e^{-\frac{t}{T}}$$

may be calculated. The values of the function $$\frac{Y}{T} e^{-\frac{t}{T}}$$

at a given time $t$ may be computed by the multiplication $$y \times \frac{1}{T} e^{-\frac{t}{T}}$$

The integral $$Y = \int_0^\infty \frac{y}{T} e^{-\frac{t}{T}} dt$$

may then be computed by known suitable graphical or numerical methods. It will also be noted that the shape of the curve of the vanillin yield for the instant reaction is characterized by having a much sharper peak than that where lime is the sole active alkali, as shown in FIGURE 2 of U.S. Patent 2,576,754. It would therefore be expected that the application of continuous process would be even less favourable in the instant case than in that considered in U.S. Patent 2,576,754. The fact, is however, as we have determined experimentally, that although in the process according to the instant invention the actual continuous process yield is lower than the maximum batch process yield, it is, nevertheless, of the order of 150% or more of that to be expected according to the well-known chemical engineering principles enunciated by MacMullen and Weber.

The reaction according to our invention therefore has characteristics which clearly distinguish it from previously known processes. It is believed that the essentially different character of our invention from that in which caustic soda is the active alkali lies in the presence in the reaction zone of lignin substance in part as an insoluble calcium derivative which is gradually solubilized as the oxidation progresses and which therefore gives to our new process, when operated on a continuous basis, some of the novel and valuable characteristics previously only known when lime is used as the sole active alkali.

The following example illustrates the application to the process of continuous operation according to our invention.

*Example 4*

A reaction was carried out in a manner similar to Example 1 except that a reaction vessel was used such as that illustrated in FIGURE 2 into which the reactants were continuously introduced and the reaction products continuously removed from the reaction zone. The ratio of alcohol plant effluent, sodium carbonate and lime were maintained at the same level as in Example 1. The reactants were fed to the reactor at a rate of 27 imp. gallons per hour. Reaction temperature was 180° C., the average holding time 46 minutes, and the rate of air flow 500 cubic feet per hour. The reactor discharge was flashed into a receiver at atmospheric pressure and products were derived from it in similar manner to Example 1 with yields (expressed as lb. per gallon, A.P.E. feed) amounting to

|  | Lb. |
|---|---|
| Solid phase [1] | 1.1 |
| Lignin substance | 0.26 |
| Vanillin | 0.03 |
| Acetovanillone | 0.003 |
| Calcium oxalate | 0.02 |
| Sodium sulphate | 1.0 |

[1] Containing 96.0% calcium carbonate.

*Example 5*

A series of experiments were run similar to Example 4 in which pertinent variables were controlled as below.

| Reaction Temp. | Total press, p.s.i.g. | Oxygen part. pressure | Holding Time | Vanillin produced, lb. per gal. A.P.E. | Lignin produced, lb. per gal. A.P.E. |
|---|---|---|---|---|---|
| 140 | 62 | 5 | 90 | .03 | .33 |
| 200 | 236 | 5 | 30 | .04 | .22 |
| 180 | 135 | 1 | 60 | .04 | .28 |

As an illustration of the relation between batch process and continuous process yields under the reaction conditions as per Example 1—the peak batch vanillin yield is shown in FIGURE 3 to be 10.1% when expressed as a percentage of the lignin substance present in the original alcohol plant effluent. The calculated theoretical continuous process yield for an average holding time of 46 minutes as per Example 4 by applying the principles hereinbefore stated is 5.5%. The actual vanillin yield on conducting the reaction in a continuous manner as per Example 4 results in yield of 8.3%. It will, therefore, be apparent that the experimentally obtained continuous process yield was substantially 83% of the peak batch yield but approximately 151% of the theoretically calculated continuous process. Other experiments which we have performed verify the above result. Because in the process according to the instant invention the continuous process yield is somewhat lower than the peak batch yield we have found that the optimum yield with continuous processing can be obtained at the holding times slightly below the time required to reach the peak yield under batch conditions. Thus in the continuous processing experiment as per Example 4 a holding time of 46 minutes was employed. According to FIGURE 3, peak batch yield is obtained at about 50 minutes. In the above mentioned correlations of vanillin yield with lignin, the lignin content of the alcohol plant effluent was measured by determining the methoxyl content of the effluent and assuming a ratio of methoxyl to lignin of 15.5 to 100.

In the examples given the lignosulfonic acid materials have been derived from sulphite pulping in which the conventional calcium base was employed. Our invention is no less applicable when other bases are employed in the sulphite pulping process. Thus, if a liquor from sodium base pulping is used as a raw material, the sodium carbonate requirement is reduced by an amount equivalent to the sodium content of the liquor. The amount of solid phase will be reduced correspondingly because less calcium carbonate will be formed. The lime requirement will be based on the same considerations as with a residual liquor from calcium base pulping. It will also be apparent that sodium values recovered may be cycled back to the sulphite pulping process, as well as to the process of the present invention. If ammonium base is used in the sulphite pulping process the ratio of sodium carbonate to lime will be based on the same considerations as with calcium base liquors. The ammonium content of the liquors will be released as free ammonia during the reaction step and may be recovered from the exhaust gases from the reactor and cycled back to the sulphite mill. If a magnesium base liquor is employed the solid phase will contain magnesium hydroxide as well as calcium carbonate and therefore cannot be calcined to a relatively pure quick lime. The other useful products may, however, be obtained according to the practice of our invention. With a magnesium base sulphite liquor additional lime will be required equivalent to the magnesium content of such liquor. This additional lime serves to precipitate magnesium values as magnesium hydroxide.

When in the examples above set out we refer to "gallons" we mean imperial gallons.

When in this specification the word "pressure" is used it is to be understood that we refer to gauge pressure and not absolute pressure.

When in the claims we refer to the use of a pH of 12 or greater, we have reference to the determination of the pH of a liquor sample withdrawn from the reactor and then cooled to room temperature.

When in the specification and claims we use the expression "lignosulfonic acid compounds" we mean thereby materials derived from lignin when so treated that sulfonic acids are formed therefrom, e.g., when lignin-containing substances are subjected to the sulphite pulping process, and including salts of the said sulfonic acids. Thus we specifically include sulphite waste liquor and such liquor which has been previously treated to reduce the fermentable sugar content thereof, but we exclude materials derived from lignosulfonic acid compounds in such manner as to effect a substantial or complete desulfonation thereof. Thus, we specifically exclude the ligneous portion of the solid phase residual from alkaline oxidation of lignosulfonic acid compounds, e.g., when the said alkaline oxidation has been carried out in the presence of lime as the active alkali.

When in the specification and claims we use the expression "raffinate residual from the extraction of vanillin" we mean and have reference to the aqueous liquor discharged from an extractor, e.g., such as if referred to as numeral 6 in FIG. 1 and numeral 9 in FIG. 2 of the drawings, in which vanillin has been removed from solution by a solvent relatively immiscible with water.

What we claim as our invention is:

1. In a process for producing vanillin from lignosulfonic acid compounds wherein the said vanillin is formed in a reaction mixture comprising an alkaline aqueous solution containing lime as an active alkali, to which sodium carbonate has been added in an amount equivalent to the calcium content of the said lignosulfonic acid compounds and an amount of lime sufficient to react with the carbonate formed in the reaction, plus an additional amount of lime and sodium carbonate which, in combination, maintain the pH of the reaction mixture (determined on a sample withdrawn from the reaction zone and cooled to room temperature) at not less than 12, and in the presence of a gas containing free gaseous oxygen in finely dispersed form, the method which comprises introducing said mixture into a reaction zone, heating the said mixture to a temperature of not less than 120° C. and not more than 200° C., maintaining the said zone under super-atmospheric pressure, continuously passing a gas containing free gaseous oxygen in finely dispersed form through said reaction zone, continuously removing residual gas, the rate of addition and removal being such as to maintain a partial pressure of oxygen in the said zone of less than 20 lbs. per square inch, the time of said reaction being less than four hours, and recovering vanillin from the resultant mixture.

2. A process according to claim 1 in which the reactants are continuously introduced into, and the reaction produced continuously removed from, the said reaction zone.

3. A process according to claim 1 in which the lignosulfonic acid compound is a liquor residual from an ammonium base sulphite pulping process and which comprises recovering ammonia values from the residual gas.

References Cited in the file of this patent

UNITED STATES PATENTS

| 2,057,117 | Sanborn et al. | Oct. 13, 1936 |
| 2,069,185 | Hibbert et al. | Jan. 26, 1937 |
| 2,140,375 | Allen | Dec. 13, 1938 |
| 2,399,607 | Servis | Apr. 30, 1946 |
| 2,419,020 | Hales | Apr. 15, 1947 |
| 2,576,752 | Fisher et al. | Nov. 27, 1951 |
| 2,692,291 | Bryan | Oct. 19, 1954 |
| 2,913,310 | Sanborn et al. | Nov. 17, 1959 |
| 2,928,868 | Grangaard | Mar. 15, 1960 |

OTHER REFERENCES

Tomlinson: "Journal of the American Chemical Society," vol. 58; pages 345–8, 1936.

Khim. Nauka i Prom., 2, No. 4, 462–465 (1957), "The Production of Vanillin from Lignosulfonates," by O. D. Kamaldina (all 8 pages).